Dec. 14, 1937.                M. W. LEWIS ET AL                2,101,860
                              WIRE CUTTING MACHINE
                              Filed March 12, 1936           4 Sheets-Sheet 1

INVENTORS
MARVIN W. LEWIS &
CARL B. JONES
BY Brockett, Hyde, Higley + Meyer
ATTORNEYS

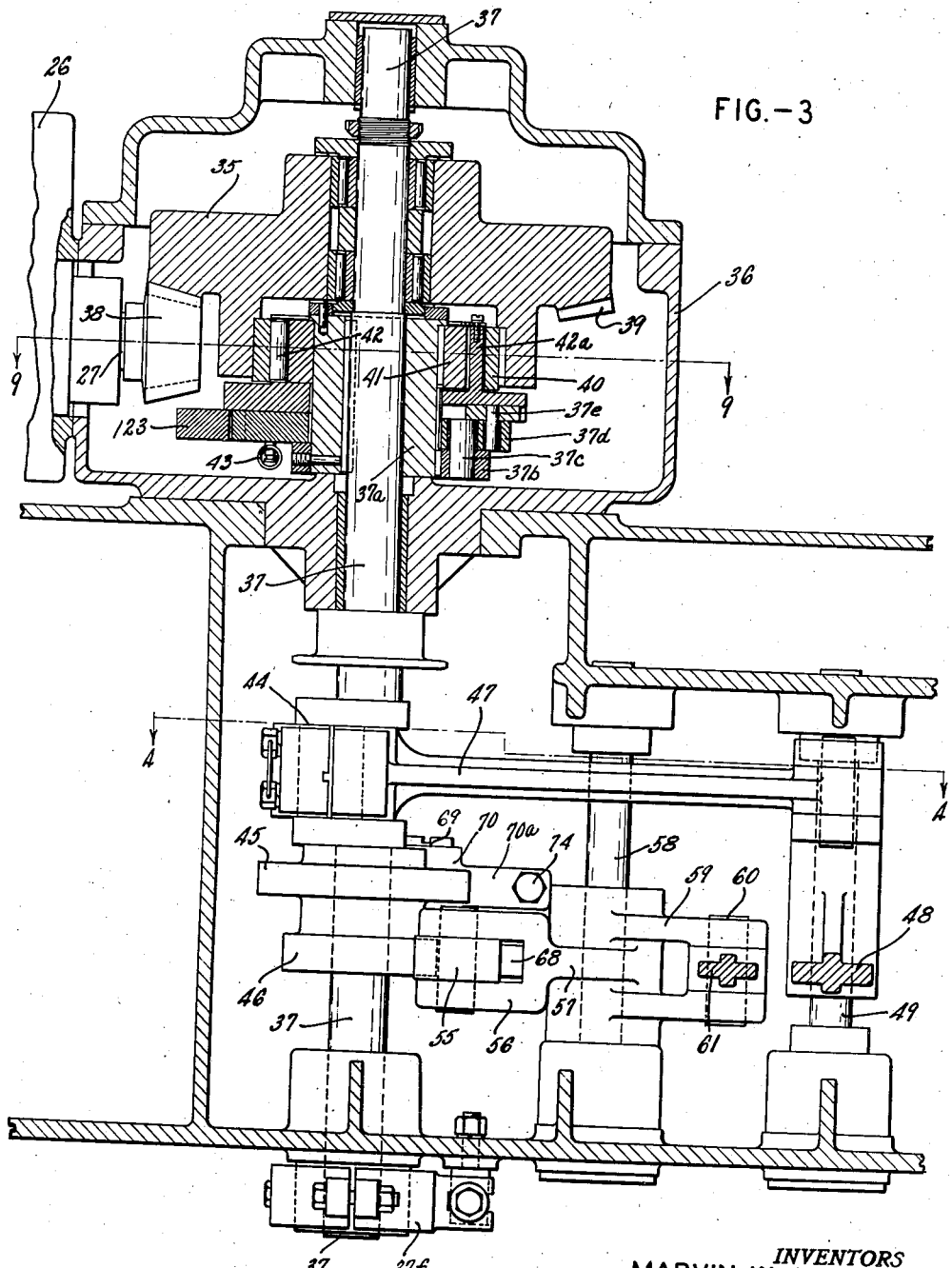

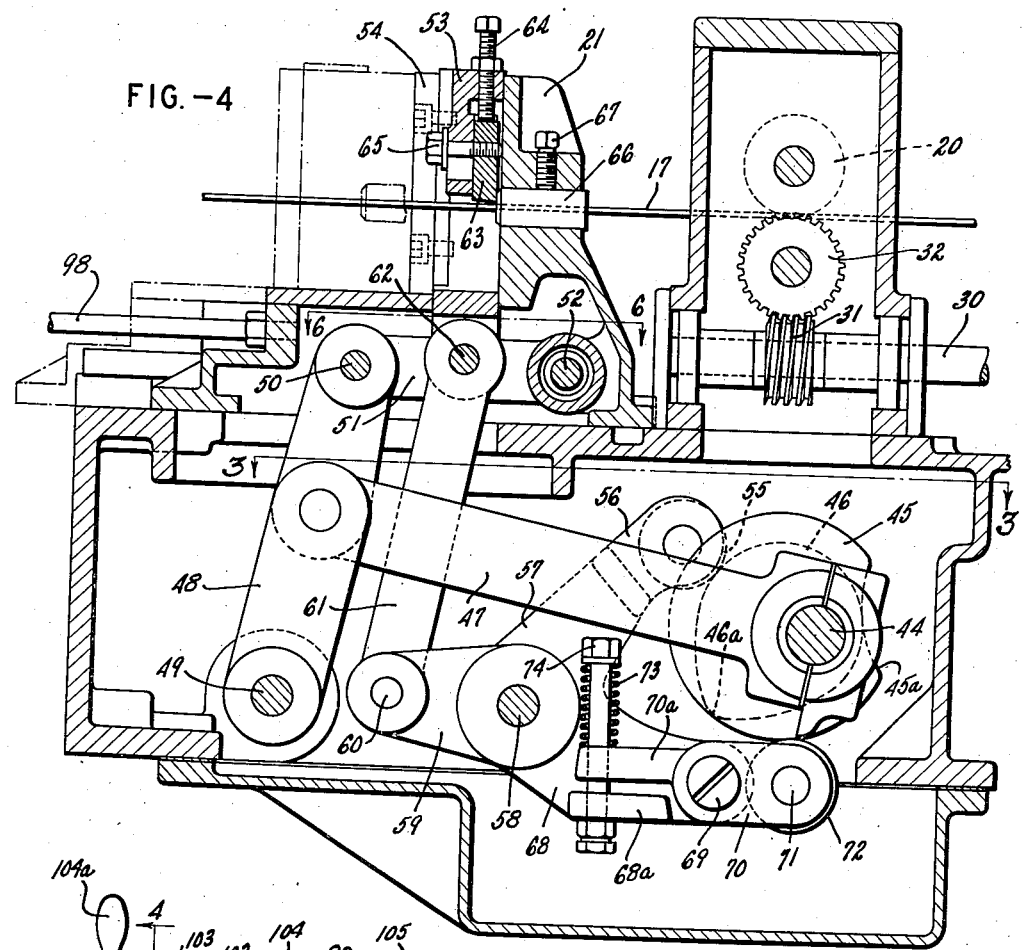

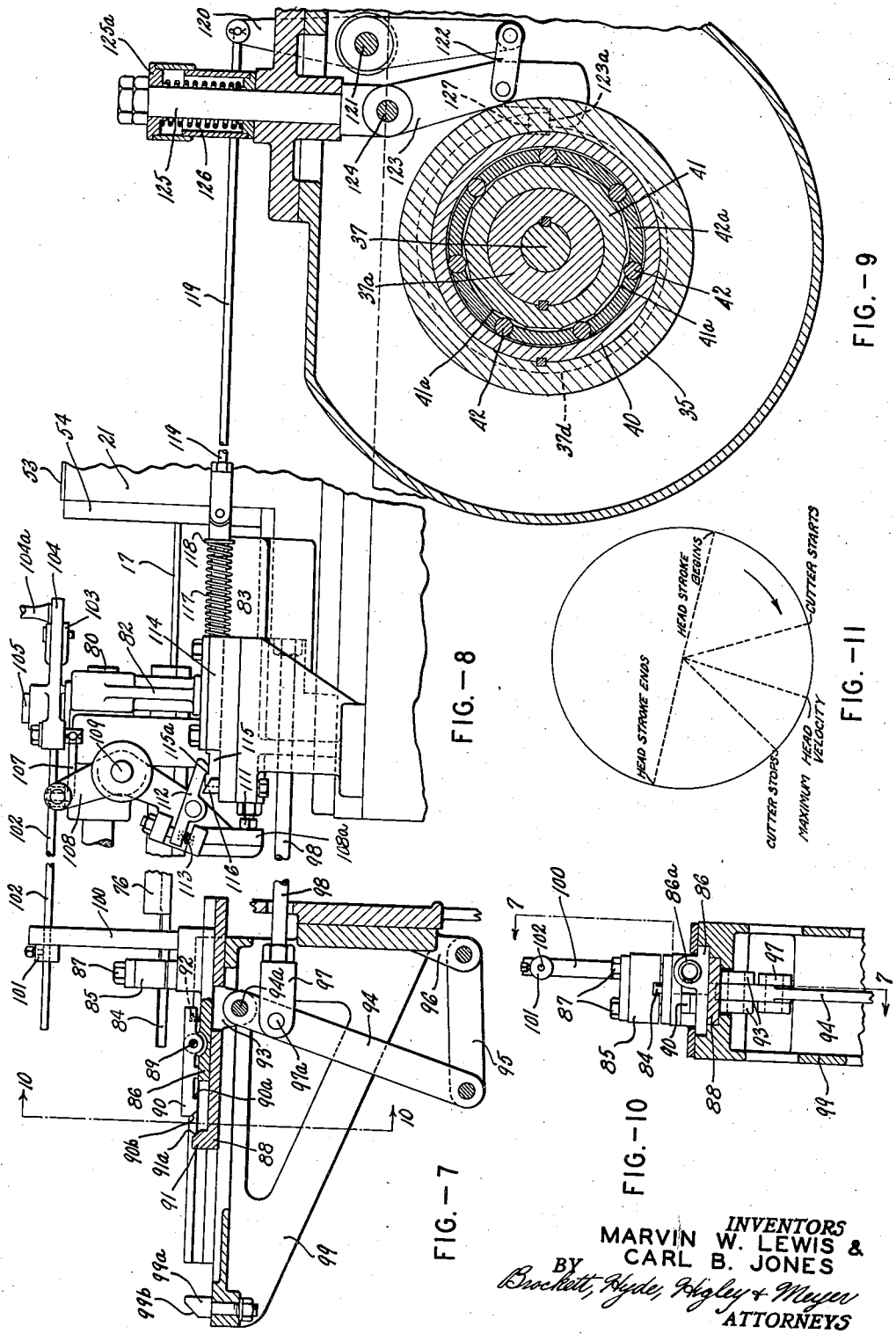

Patented Dec. 14, 1937

2,101,860

UNITED STATES PATENT OFFICE 2,101,860

WIRE CUTTING MACHINE

Marvin W. Lewis, Cleveland Heights, and Carl B. Jones, East Cleveland, Ohio, assignors to The Lewis Machine Company, Cleveland, Ohio, a corporation of Ohio Application March 12, 1936, Serial No. 68,390

11 Claims. (Cl. 140—140)

This invention relates to improvements in wire cutting machines of the type which repeatedly cut predetermined lengths of wire from a continuous straight wire passing through the machine.

An object of the present invention is to provide a machine which will cut the wire rapidly and accurately into pieces of predetermined length substantially without interrupting the feed of the wire through the machine and without substantially slowing down the wire during the cutting operation.

Another object of the present invention is to provide novel means for cutting a traveling wire.

Another object of the present invention is to provide novel gaging mechanism for coacting with the cutting head so as to rapidly and accurately gage and cut a predetermined length of wire.

Other objects of our invention are the provision of novel drive means in a machine of the type described, novel arrangements for supporting and releasing the cut lengths of wire, novel gage bar supporting means, and other features which will be apparent as the description proceeds and as illustrated in the accompanying drawings.

Figure 1:
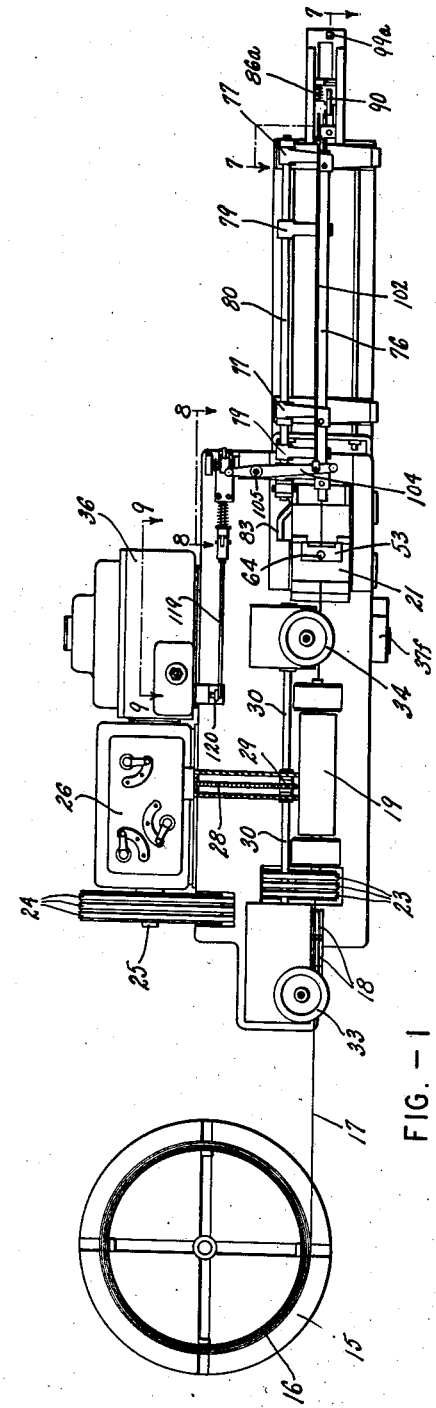
Figure 2:
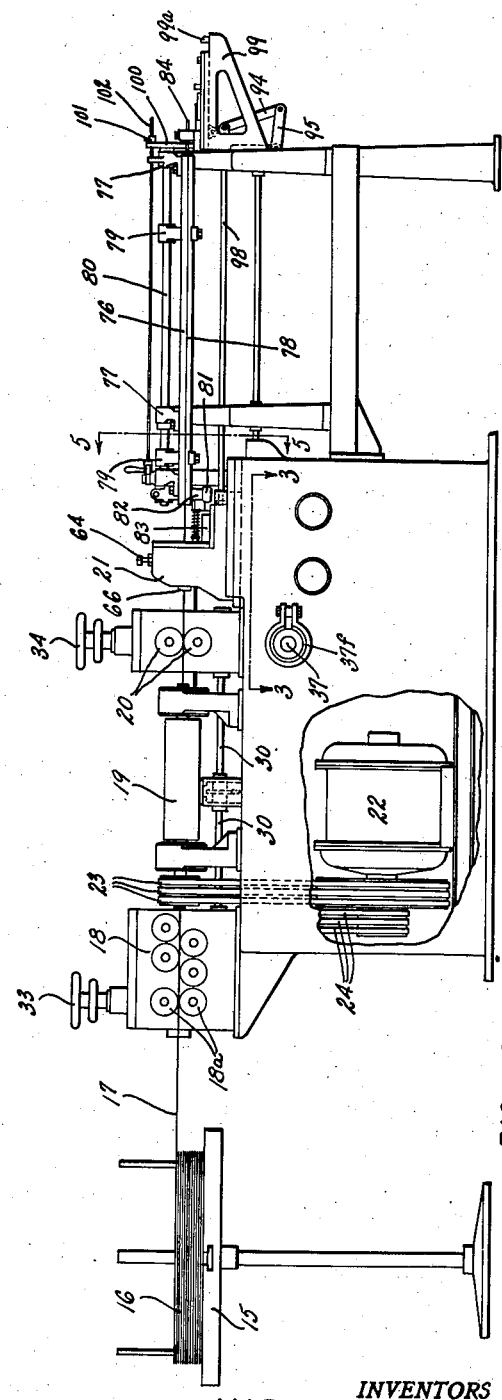

In the drawings, Fig. 1 is a plan view of a machine embodying our invention; Fig. 2 is an elevation partly broken away of the machine of Fig. 1; Fig. 3 is a sectional view taken along the line 3—3 of Figs. 2 and 4; Fig. 4 is a sectional view taken along the line 4—4 of Fig. 3 for the lower part of the machine, and along the line 4—4 of Fig. 5 for the upper part of the machine; Fig. 5 is a sectional view along the line 5—5 of Fig. 2; Fig. 6 is a sectional view along the line 6—6 of Fig. 4; Fig. 7 is a view along the line 7—7 of Figs. 1 and 10; Fig. 8 is a view along the line 8—8 of Fig. 1; Fig. 9 is a sectional view along the line 9—9 of Fig. 3; Fig. 10 is a sectional view along the line 10—10 of Fig. 7; while Fig. 11 is a diagram showing the relation of cutter movement to head stroke.

Our invention may be applied to the operation of rapidly cutting predetermined lengths of a continuously fed straight wire in any type of machine but for purposes of illustration we have shown it in conjunction with a wire straightening machine as such combinations are well known in this art. In Figs. 1 and 2 we have illustrated such a machine wherein a reel 15 supports a coil of wire 16 from which a strand 17 is unwound and passes through straightening rolls indicated generally at 18, a straightening arbor 19, a pair of feed rolls 20 and through a cutting head 21.

A motor 22 is mounted in the base of the machine and its pulley is connected by a plurality of V-belts 23 with the shaft of the straightening arbor 19 so that when the motor is operated the arbor is rapidly rotated and straightens the wire by alternately crimping it in opposite directions as is well known in this art. The motor has a second drive connection by means of V-belts 24 with the driving shaft 25 of a change speed transmission 26. This transmission has one driven shaft 27 by which the wire cutting means is operated as will be later described. The transmission 26 has another power take-off at 28 by means of a chain engaging a sprocket 29 on a shaft 30 which drives the straightening and feed rolls 18 and 20 by worm and gear drives such as that illustrated at 31, 32 in Fig. 4. The pair of rolls 18a and the pair of rolls 20 are pinch rolls, that is to say, the wire passes through coacting peripheral grooves in these wheels in a manner to be pinched between them so that the speed of the wire is substantially in timed relation to the speed of the sprocket 29 and therefore geared to the transmission 26. The sets of rolls indicated at 18a and 20 are adjustably controlled by the hand wheels 33 and 34 respectively, so that their height above the frame may be varied.

The driving means for the cutting head 21 is best seen in Figs. 3, 4 and 6. The shaft 27 which is driven from the transmission 26 has a driving connection with a flywheel 35 encased within the housing 36 and rotatably mounted upon a shaft 37 which is journalled in suitable bearings in the frame. This driving connection is by means of the beveled pinion 38 on the shaft 27 which engages with a bevel gear 39 on the face of the flywheel. Rigidly connected with the flywheel is a clutch member 40. Rigidly mounted upon the shaft 37 is a sleeve 37a to which is keyed clutch member 41. These two clutch members are operatively connected by that type of drive which is known as an overrunning clutch, that is to say, when the rollers 42 carried by cage 42a are wedged between the cam points 41a of the member 41 and the member 40 the clutch is engaged and when the rollers are loose between the cam points the clutch is released. A ring 37b keyed to sleeve 37a carries a pin 37c upon which is pivoted a ring 37d adapted to oscillate on sleeve 37a. Pin 37e carried by the oscillating ring engages cage 42a. Spring 43 biases ring 37d in a direction to cause clutch-engaging movement of cage 42a. A lug 127 on the oscillating ring 37d is adapted to strike a shoulder 123a (later described) to cause clutch-releasing movement of cage 42a. A slight braking effect is provided at 37f to stop shaft 37 upon clutch release.

Rigid with the shaft 37 and rotating therewith is an eccentric 44 and two cams 45 and 46. The eccentric 44 is connected by the connecting rod 47 with an oscillating link 48 which is pivotally mounted upon a suitable shaft 49 carried by the frame. Link 48 in turn is connected by pin 50 with a pair of links 51 housed in the base of the cutting head 21, and these links in turn are connected with the cutting head by means of the pin 52 carried by the head. It results from this connection that rotation of shaft 37 moves the eccentric from the dead center position shown in full lines in Fig. 4 to the opposite dead center position while the head 21 in turn moves from the full line position shown in Fig. 4 to the dot-dash position indicated therein.

The cam 46 is operatively connected with a wire cutting shear 53 which is mounted for vertical reciprocation in suitable ways 54 in the head 21. Coacting with the cam 46 is a follower 55 rotatably mounted in the bifurcated end 56 of a crank 57 which in turn is rigidly mounted on a shaft 58 supported in the frame. Another crank arm 59 rigid with shaft 58 is pivotally connected at 60 with a link 61 whose other end is pivotally connected at 62 with the shear member 53. This shear member carries an adjustable blade 63 whose vertical position is adjustable by means of the screw 64 and the blade is held in the reciprocating member 53 by means of the cap screw 65. The cutting head 21 carries a wire guiding and supporting die 66 which is held in place by the set screw 67. The operation which takes place during the cutting of a wire is best seen in Fig. 4 and is as follows: The high portion 46a of the cam 46 engages follower 55 and moves the arms 56 and 59 counterclockwise resulting in a downward pull on link 61 and the reciprocating shear member 53 causing the blade 63 to cut the wire 17 at the point where it emerges from the die 66.

Means is provided to insure that the follower 55 and cam 46 are always in contact and in the form shown an arm 68 rigid with shaft 58 is pivotally connected at 69 with a bracket 70 which supports on the pivot 71 a roller 72 adapted to follow the surface of cam 45. The bracket 70 has a lug 70a, the arm 68 has a lug 68a, and these lugs are biased toward each other by a spring 73 which is held in place by bolt 74. As cam 46a moves follower 55 in a counterclockwise direction, roller 72 will move in a counterclockwise direction and the cam 45 is provided with a recess 45a to permit this movement of roller 72 without disturbing the resilient connection between the lugs 70a and 68a. However, if there is any play in the parts the bracket 70 is free to move relative to the arm 68 with a resulting additional compression of spring 73 which produces a rapid return of the follower 55 toward the cam 46 upon further rotation of shaft 37 to carry the recessed portion 45a of cam 45 beyond the roller 72.

It will be noted that with the parts in the position of Fig. 4, the cam portion 46a must travel approximately 90° before transmitting its full effect to the follower 55 which, as described above, results in a stroke of the cutting blade 63. The shape and position of cam 46 is such that the downward stroke of the blade 63 does not commence until the eccentric 44 has traveled substantially 60° in a clockwise direction from the position shown in Fig. 4 and the blade completes its cut in the following 60° which therefore is the 60° located midway between the dead center positions of the eccentric 44. To express this in other terms, the cutting head has zero travel at the ends of its stroke and has a maximum speed during the midportion of its stroke because it is driven by the eccentric 44. The cam 46 is arranged to make a short, quick cutting stroke of the blade 63 during the midportion of the stroke of the head to the left as viewed in Fig. 4 which is the period of maximum velocity of the head. The timing is shown in Fig. 11.

As the wire is fed by the rolls 18a and 20 through and past the cutting head 21, it enters the downwardly opening T-shaped slot 75 in a guide bar 76 which is supported on brackets 77 connected with the frame of the machine. During the gaging and cutting of a length of wire a clapper bar 78 is held in the position of Fig. 5 to close the bottom of the opening 75 by means of arms 79 which are rigid with the oscillatable bar 80. When the length of wire has been cut it is dropped out of the recess 75 by rotating arms 79 in a counterclockwise direction as viewed in Fig. 5 and the wire drops into a suitable receiving member, generally a pan carried by the frame of the machine. This movement of arms 79 is provided in our improved machine by means of a follower 81 which is carried on an arm 82 rigid with shaft 80. The follower 81 coacts with a cam 83 on the lower inside edge of the head 21. This cam 83 is arranged to actuate the follower 81 and drop the wire just after the wire has been cut.

To gage the length of the wire before cutting, a gage bar 84 generally complementary in section to the T-shaped recess 75 is placed in the guide bar in a manner to extend out of the rear end thereof where it is clamped in the clamping member 85 of the gage slide 86 by means of the cap screws 87. This gage slide 86 is mounted in suitable ways in the frame directly over a locking slide 88 also reciprocable in the frame in the direction of wire movement. A spring 86a (see Fig. 10) is held between a shoulder on the slide 86 and another shoulder on the slide 88 so as to be compressed by movement of the slide 86 toward the left relative to slide 88 (see Fig. 7). Pivotally mounted at 89 on the slide 86 is a locking lever 90 which is provided with a shoulder 90a adapted to engage the shoulder 91 on the slide 88. Portions 91a on the member 88 and 90b on the lever 90 cam the locking lever over the shoulder 91. A spring 92 urges the lever toward locking position. The slide 88 has a pair of depending ears 93 to which is pivotally connected one end of a link 94. The lower end of link 94 is pivotally supported on link 95 which in turn is pivotally mounted on a bracket 96 connected with the frame. Near the upper end of link 94 and below the pivotal connection 94a is a clevis 97 pivotally connected at 97a with the link 94 and in turn rigidly connected by a rod 98 with the cutting head 21. At the extreme end of the bracket portion 99 of the frame which supports the slides 86 and 88 is a trip member 99a which, in the position shown in Fig. 7, engages a portion 90b of the locking lever 90 at the end of the stroke of the slide 88 and disengages the shoulder 90a from the shoulder 91 so as to unlock the lever 90 from the slide 88. If the trip member 99a is turned so as to present the surface 99b to the right as viewed in Fig. 7 no such unlocking action takes place. The usefulness of this arrangement will be later described.

Rigid with the slide 86 is a bracket portion 100 which may be adjustably connected by collar 101 with a rod or wire 102 which extends back through suitable connections to control the overrunning clutch previously mentioned. The rod 102 is connected by a clevis 103 with one end of a lever 104 which in turn is pivotally mounted intermediate its ends at 105 on a portion of the machine frame. Handle 104a is provided for manual manipulation of this lever. The other end of lever 104 is pivotally connected at 106 by means of a link 107 with a lever 108 which in turn is pivotally mounted at 109 on a suitable bracket connected with the frame. This lever is biased for movement in a counterclockwise direction by means of a spiral spring 110 mounted on a non-rotatable pivot pin 109 with one end connected to the pin and its other end connected to lever 108. Lever 108 carries at its lower end a stop member 108a which engages an adjustable screw 111 on the frame of the machine. Pivotally mounted on the lower arm of lever 108 is a locking dog 112 biased in locking direction by a spring 113. Reciprocably mounted in guideway 114 on the frame is a bar 115 which is provided with a shoulder 115a which is normally engaged by the locking dog 112. A trip member 116 will lift the dog out of engagement with the shoulder 115a upon travel of the dog 112 toward the left as viewed in Fig. 8. A spring 117 acting against a collar 118 at its one end and against a fixed portion of the frame at its other end biases the bar 115 and the connecting link 119 toward the right as viewed in Figs. 8 and 9. The link 119 is connected with the upper arm of lever 120 pivotally supported at 121 on the frame of the machine. The lower arm of lever 120 is connected by a link 122 with the clutch control lever 123. This lever is pivotally supported at 124 on the bolt 125 which is mounted for reciprocation in a portion of the frame and carries a spiral spring 126 between the collar 125a on the bolt and the frame of the machine. The lever 123 has a shoulder 123a which is adapted to engage a lug 127 on the oscillating ring 37d.

The operation of the machine is as follows: The coil of wire is suitably supported on the reel 15 and the end 17 is threaded through the rolls 18, the arbor 19, the rolls 20, and the die 66 of the head 21. The motor 22 is then started and the wire is straightened and fed through the cutting head 21 until the end of the wire strikes the gage bar 84. During this operation the flywheel 35 is rotating but shaft 37 is at rest because lever 123 engages the lug 127 of the oscillating ring 37d so that the clutch is not engaged. As the wire strikes the gage bar 84 it begins to move the slide 86 toward the end of the machine or to the left as viewed in Fig. 7 and this movement continues until bracket 100 pulling upon the bar 102 has caused movement of link 107 toward the right as viewed in Fig. 8 with consequent clockwise movement of lever 108 and a pull toward the left of locking dog 112 and bar 115. This causes movement to the left of link 119 in Fig. 9, counterclockwise movement of levers 120 and 123, thus removing shoulder 123a from lug 127, whereupon the clutch engages causing rotation of shaft 37 with eccentric 44 and cam 46 moving therewith. The cutting head 21 then begins its stroke toward the left as viewed in Fig. 4 but this movement is slow at first and the wire 17 travels at a greater speed than the head during the first part of the stroke as the two move toward the left as viewed in Figs. 4, 7 and 8. Referring to Figs. 7 and 8, the bar 98 being rigid with the head 21 will move at the same speed as the head and the slide 88 will move at a slightly greater speed than the head because of the relative position of the pivots 97a and 94n on the link 94. The wire 17 pushing against the gage bar 84 which is clamped in the slide member 86 will therefore cause movement of the locking lever 90 toward the left as viewed in Fig. 7 more rapidly than slide member 88 moves toward the left and the locking bar will thus catch up with the shoulder 91 so that shoulder 90a will engage shoulder 91 and thereafter the slide members 86 and 88 will move toward the left together. It results from this arrangement that a timing period is provided from the time the wire 17 first strikes the gage bar until the locking lever 90 engages the shoulder 91. This gives an opportunity for the wire to come to rest against the gage bar and to move along with the gage bar at substantially the natural speed of travel of the wire. The driving mechanism for the head 21 is so arranged that during the midportion of a stroke of the head it is traveling at substantially the same speed as the wire. Therefore, when the locking member 90 has engaged the shoulder 91 and the gage bar, the wire and the cutting head are moving at substantially the same speed, the wire may be accurately cut to length. This is then accomplished by means of the cam portion 46a actuating the follower 55 as formerly described during the midportion of the head stroke and while the locking lever 90 is engaged with the shoulder 91. Upon completion of the cut and the return of the cutting blade 63 upwardly the head completes its stroke toward the left as viewed in Fig. 4 but at the same time the gage bar 84 and the slide members 86 and 88 are moving toward the left as viewed in Fig. 7 at a slightly higher speed than the head due to the aforementioned multiplication of motion by reason of the positioning of pivots 97a and 94a on the link 94. This causes the gage bar to move away from the end of the wire 17 so that the wire is free to drop when the clapper bar 78 is lowered by the counterclockwise rotation of arm 79 as viewed in Fig. 5 upon engagement of follower 81 with cam portion 83 of the head 21. The rotation of lever 108 at the time the clutch is tripped is sufficient to move the locking dog 112 to the left in Fig. 8 until the trip member 116 releases the locking dog from the shoulder 115a of the bar 115. Thereupon the spring 117 returns the shoulder 123a to the position shown in Fig. 9 and upon the completion of one rotation of the clutch the lug 127 engages the shoulder 123a and releases the clutch. The shock of the engagement of the parts when the clutch is released is absorbed by the spring 126.

We have so arranged the transmission 26 as to permit the coordination of the speed of the wire and the operation of the cutting means so that certain selected lengths of wire may be cut with a constantly running clutch, that is to say, the locking dog 112 is held out of engagement with shoulder 115a and the trip member 99a is turned to present the face 99b toward the right as viewed in Fig. 7 so that the locking lever 90 is always engaged with the shoulder 91. It results from this arrangement that the wire is fed through the cutting head substantially the desired length for each rotation of shaft 37 (this length however being gaged by a suitable gage bar 84) and the cutting blade 69 cuts off this length of wire and the head returns to position for the next cut just as approximately the right length of wire has been fed through the head for the next piece. This gives a very fast cutting operation on these selected short lengths of wire without use of the clutch.

It will be noted that combined with the substantially positive control of the rate of feed of the wire and the geared relationship of the speed of the head therewith we have provided a machine which will move the cutting head during the central portion of its stroke in the direction of wire feed at substantially the same speed as the wire and the cut is started and completed during this period of synchronized speeds so that the cut is made after the wire has been accurately gaged and without substantially retarding the wire. Other machines are known to us which start the cutting of the wire while the head is still at the beginning of its stroke and is traveling at substantially less speed than the wire. These prior machines do not provide an interval for accurately gaging the wire while the wire, gage and cutting head are moving. By our improved cutting mechanism we provide a wire higher in surface quality and more accurate as to length than has been heretofore produced in high speed machines of this type.

What we claim is:

1. In a machine of the class described, means for feeding a wire along a path, a cutting head reciprocable along a portion of said path, wire cutting means carried by said head, a rotatable shaft, an eccentric and a cam rotatable with said shaft, an operative connection between said eccentric and said head for reciprocating the latter whereby a stroke of said head corresponds to movement of said eccentric between dead centers, and an operative connection between said cam and cutting means for actuating the latter, said cam and connection being arranged to start actuation of said cutting means upon movement of said eccentric substantially sixty degrees from one of its dead centers.

2. In a machine of the class described, means for feeding a wire along a rectilinear path, a cutting head reciprocable along a portion of said path, wire cutting means carried by said head, stop means positioned in the path of travel of said wire for gaging a length to be cut by said cutting means, means for reciprocating said head and for actuating said cutting means during an intermediate portion of a stroke of said head in the direction of wire feed, a rod reciprocable with said head, and an operative connection between said rod and said stop means for moving the latter in the direction of wire feed during a later portion of said head stroke.

3. The combination of claim 2 in which said connection between said rod and stop means comprises a link pivotally mounted on said machine and having operative connections with said stop means and with said rod, and the latter connection being nearer said pivot, whereby said stop means travels faster than said head.

4. In a machine of the class described, means for feeding a wire along a rectilinear path, a cutting head reciprocable along a portion of said path, wire cutting means carried by said head, means for moving said head during a portion of its stroke in the direction of wire feed at substantially the speed of said wire, means for actuating said cutting means during said portion of said head stroke, stop means located at the end of said rectilinear path and adapted to engage the end of said wire for gaging purposes, and means for moving said stop means in synchronism with the movement of said head during the portion of said head stroke when said cutting means is actuated.

5. The combination of claim 4 in which said last named means comprises two members movable in a direction parallel to said path, means causing one of said members to move in synchronism with said wire, means causing the other of said members to move in synchronism with said head, and means for locking said members together during the portion of said head stroke when said cutting means is actuated.

6. In a machine of the class described, means for feeding a straight wire along a rectilinear path, a cutting head reciprocable along a portion of said path, wire cutting means carried by said head, means for reciprocating said head and for actuating said cutting means during an intermediate portion of a stroke of said head in the direction of wire feed, and stop means positioned in the path of travel of said wire for gaging a length to be cut, said stop means comprising a guide bar having a longitudinally extending slot generally T-shape in section and opening downwardly, said slot being positioned to receive within it wire fed along said path, and a gage bar T-shape in section adapted to slidably enter said slot and to be held by said guide bar.

7. In a machine of the class described, means for feeding a wire along a rectilinear path, a cutting head reciprocable along a portion of said path, wire cutting means carried by said head, stop means positioned in the path of travel of said wire for gaging a length to be cut by said cutting means, means for reciprocating said head and for actuating said cutting means during an intermediate portion of a stroke of said head in the direction of wire feed, said last named means including a one-revolution clutch normally in non-driving position, and means for causing driving engagement of said clutch including an operative connection between said stop means and clutch, said connection including a latch and means for disengaging said latch by movement of said stop means beyond that necessary to cause driving engagement of said clutch.

8. In a machine of the class described, means for feeding a wire along a rectilinear path, means adjacent said path for cutting said wire into short lengths, stop means located at the end of said path and adapted to engage the end of said wire for gaging purposes, said stop means comprising a part a fixed distance from said cutting means and a part engageable by said wire and movable relative to said fixed part, said fixed part being arranged to limit the movement of said movable part for a wire-cutting operation, and means for moving said fixed part away from the end of said wire after said cutting operation to release the cut length of wire.

9. In a machine of the class described, means for feeding a wire along a rectilinear path, means adjacent said path for cutting said wire into short lengths, stop means located at the end of said path and adapted to engage the end of said wire for gaging purposes, means for actuating said cutting means including a clutch normally in non-driving position, and means for causing driving engagement of said clutch including an operative connection between said stop means and clutch, said connection including a latch and means for disengaging said latch by movement of said stop means beyond that necessary to cause driving engagement of said clutch.

10. In a machine of the class described, a frame, means for feeding a wire along a rectilinear path, a cutting head reciprocable along a portion of said path, coacting ways on said head and frame for guiding said reciprocation, wire cutting means carried by said head, means for reciprocating said head including a rotatable shaft and eccentric and an operative connection between said eccentric and said head, and said connection with said head being arranged to exert its force substantially parallel to and close to the plane of said ways throughout the reciprocating movement of said head.

11. In a machine of the class described, a frame, means for feeding a wire along a rectilinear path, a cutting head reciprocable along a portion of said path, coacting ways on said head and frame for guiding said reciprocation, wire cutting means carried by said head, means for reciprocating said head including a rotatable shaft and eccentric and an operative connection between said eccentric and said head, and said connection with said head including a lever pivoted on said frame and having a part connected with said head and oscillatable about said pivot in a short arc substantially parallel to and close to said ways.

MARVIN W. LEWIS.
CARL B. JONES.